(12) United States Patent
Futtere

(10) Patent No.: US 12,188,753 B1
(45) Date of Patent: Jan. 7, 2025

(54) MECHANICAL SHAFT INSERT/OUTSERT APPARATUS AND METHOD

(71) Applicant: Matthew Futtere, Fredericksburg, TX (US)

(72) Inventor: Matthew Futtere, Fredericksburg, TX (US)

( * ) Notice: Subject to any disclaimer, the term of this patent is extended or adjusted under 35 U.S.C. 154(b) by 12 days.

(21) Appl. No.: 18/091,715

(22) Filed: Dec. 30, 2022

Related U.S. Application Data

(60) Provisional application No. 63/294,905, filed on Dec. 30, 2021.

(51) Int. Cl.
*F42B 6/08* (2006.01)
*F16B 7/02* (2006.01)

(52) U.S. Cl.
CPC .............. *F42B 6/08* (2013.01); *F16B 7/025* (2013.01)

(58) Field of Classification Search
CPC .... F42B 6/08; F16B 7/00; F16B 7/025; F16B 7/0413; F16B 2012/403
See application file for complete search history.

(56) References Cited

U.S. PATENT DOCUMENTS

| | | | | |
|---|---|---|---|---|
| 2,308,542 | A * | 1/1943 | Raybould | F16B 7/025 403/370 |
| 3,114,528 | A * | 12/1963 | Forest | F16B 7/025 411/54 |
| 5,269,534 | A * | 12/1993 | Saunders | F42B 6/08 473/582 |
| 7,296,947 | B2 * | 11/2007 | Schmieder | B62D 25/147 403/368 |
| 7,651,421 | B2 * | 1/2010 | Smith | F42B 6/08 473/582 |
| 8,016,703 | B1 * | 9/2011 | Kronengold | F42B 6/08 473/582 |
| 8,480,520 | B2 * | 7/2013 | Webber | F42B 6/08 473/582 |
| 9,085,338 | B2 * | 7/2015 | Ma | B62K 21/24 |
| 9,410,773 | B2 * | 8/2016 | Greenwood | F42B 6/08 |
| 9,739,581 | B2 * | 8/2017 | Zobell | F42B 6/08 |
| 9,772,169 | B2 * | 9/2017 | Greenwood | F42B 6/04 |
| 11,022,413 | B1 * | 6/2021 | Broderick | F42B 6/08 |
| 11,460,278 | B2 * | 10/2022 | Keeney | F42B 6/08 |
| 2005/0248156 | A1 * | 11/2005 | Hsieh | F16B 7/025 285/397 |
| 2013/0170900 | A1 * | 7/2013 | Bay | F16B 13/063 29/428 |
| 2017/0067723 | A1 * | 3/2017 | Pedersen | B29C 45/0013 |
| 2019/0265007 | A1 * | 8/2019 | Gizowski | F42B 6/08 |

* cited by examiner

Primary Examiner — John A Ricci
(74) Attorney, Agent, or Firm — J. Nevin Shaffer, Jr.

(57) ABSTRACT

A mechanical shaft insert/outsert apparatus and method has a receiver and a wedge where the wedge has a first dimension and a second dimension where the second dimension is larger than the first dimension wherein the receiver and wedge are configured to connect with a shaft. An extension configured to connect with the receiver and the wedge such that the connection draws the wedge and the receiver together causing the receiver to deform and contact the shaft.

16 Claims, 12 Drawing Sheets

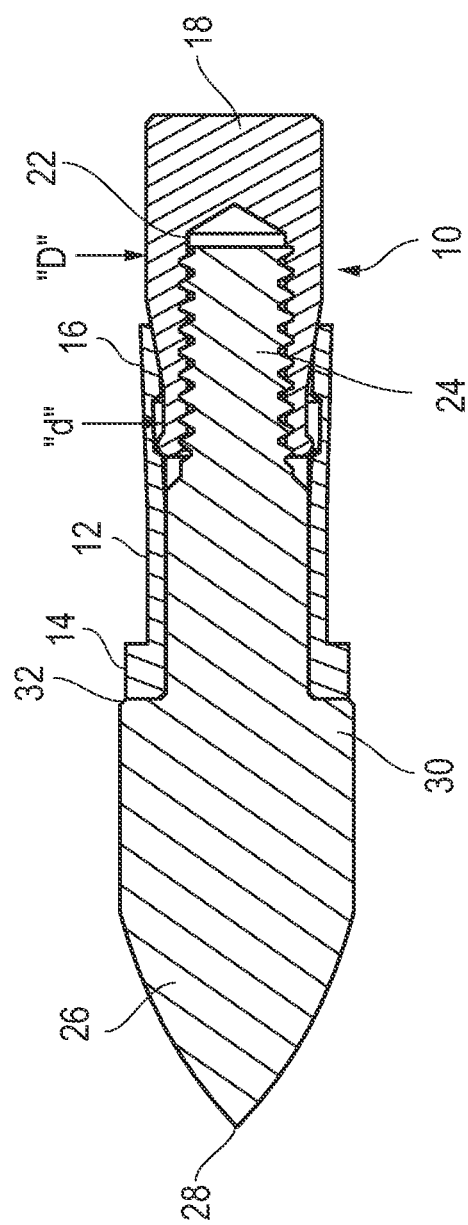
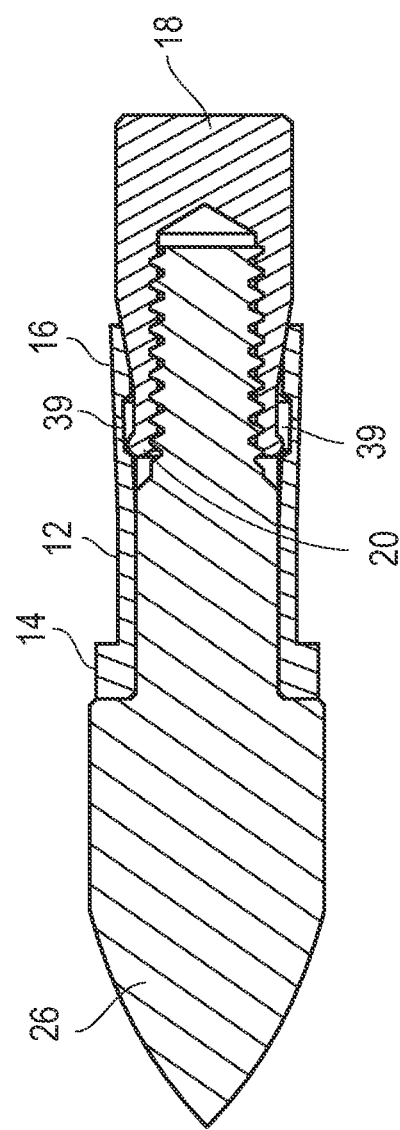
FIG. 6
FIG. 7

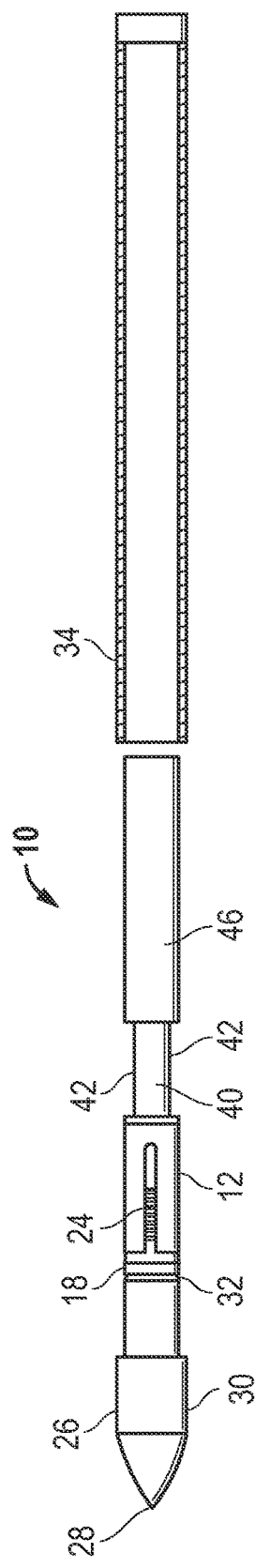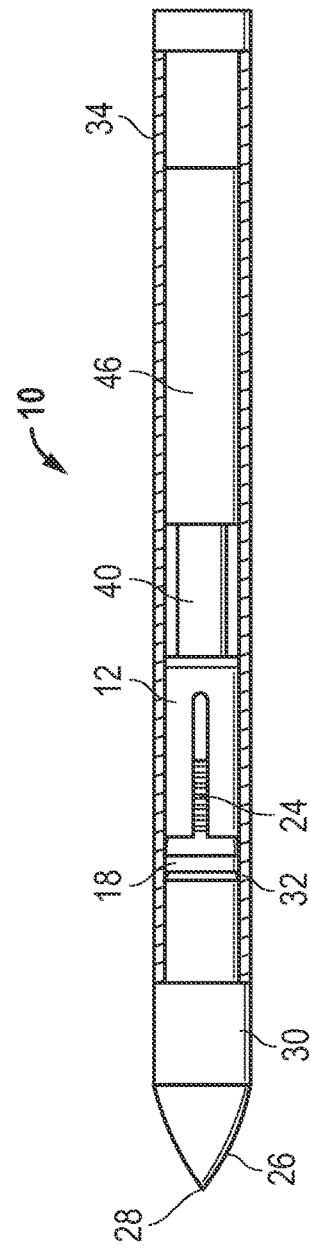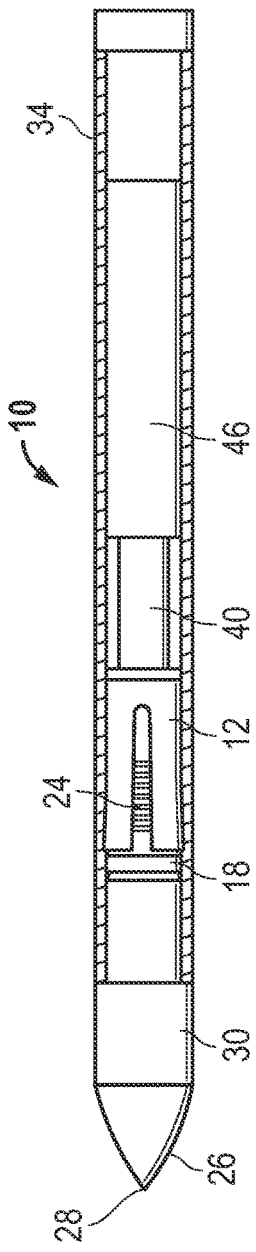

MECHANICAL SHAFT INSERT/OUTSERT APPARATUS AND METHOD

CROSS REFERENCE TO RELATED APPLICATION

This application claims the benefit of previously filed U.S. provisional patent application No. 63/294,905 filed Dec. 30, 2021 for a "Mechanical Shaft Insert Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to a mechanical shaft insert/outsert apparatus and method with a receiver and a wedge where the wedge has a first dimension and a second dimension where the second dimension is larger than the first dimension wherein the receiver and wedge are configured to connect with a shaft. An extension is configured to connect with the receiver and the wedge such that the connection draws the wedge and the receiver together causing the receiver to deform and contact the shaft.

BACKGROUND OF THE INVENTION

A variety of industries require use and manipulation of shafts. Concrete pipe and solid bars, for example only and not by limitation, must be maneuvered for placement and installation and often requires the pipe or bars to be lifted. Secure connection in this case with straps and chains is complicated and time consuming in order to prevent the pipe or bars from slipping during handling. However, the need for connection with the pipe or bar is only temporary so that there is a need for an easy to attach and remove connection that enables movement and control of shafts such as pipe, bars, and tubes or the like.

Shafts may be solid or hollow. The logging industry must handle large logs, the telephone industry handles large wooden, metal and concrete poles/shafts, for example only, that are not hollow but are just as difficult to maneuver as the pipe just described.

Other industries, recreational in nature, such as archery, for example only and not by limitation, require field points, target tips, etc, to be attached to shafts which may be at least partially hollow. Currently, shaft "inserts" are a standard mechanical device used, for example only and not by limitation, on the hollow end of both arrows and bolts that allow a field point, target tip or broadhead to be attached to the arrow shaft or bolt shaft. Inserts are typically made from a variety of metals such as aluminum, brass and steel. Inserts are the global and/or industry standard device for connection between a field point or broadhead to the arrow shaft and come in a large variety of weights and sizes to accommodate the massive variety in differences between arrow shafts and bolt shafts.

According to the prior art, manufacturers, individual archers and bow hunters who assemble/build arrows and bolts accomplish the task of securing the insert to the arrow shaft/bolt by means of some adhesive method such as epoxy, hot melt glue or super glue. Once the insert is glued in place, connection with the insert is accomplished by tightening either a target tip or broadhead down into the insert until it is mechanically locked and tight. The field point/broadhead locks into the insert that has been previously glued/bonded to the arrow or bolt shaft end in order to create an effective, single projectile ready to be launched.

Prior art, industry standard, "inserts" are a simple, static single piece of metal hardware product. Again, their proper use mandates use of some form of permanent or semi-permanent bonding agent to affix them inside the arrow shaft so they cannot pull out, even with repeated and abusive use. The prior art, static, fixed in place, insert remains basically permanently fused within the arrow shaft.

Problems arise, however, when the adhesive fails so the insert and whatever is screwed into it, a field point or arrow point, for example, pulls out and remains deeply embedded within a target when the arrow is removed leaving the insert behind. Further, prior art insert glue systems may fail in the field so that the insert falls out unnoticed by the bow hunter rendering one of his arrows not usable in the field where typically a low number of arrows are available on a hunt.

In addition, through normal wear and tear use of arrows and bolts in practice and in hunting, arrow shafts or bolts break or crack and therefore become unsafe to shoot again. When this happens, trying to remove the insert so as to save an insert for use with another arrow shaft is difficult. Typically recovery of a prior art insert mandates use of either a torch to heat up the shaft and then attempt via physical force to remove and salvage the insert. More typically, an archer simply throws the broken arrow away with the brass, aluminum or steel insert still bonded to the broken arrow or bolt.

Further, arrow and bolt shafts vary in circumference and shafts with small diameters are also fitted with inserts in the same manner as described above. In some cases the shafts, pipes or arrows or otherwise, are too small for an insert. In that case, Applicant has developed an "Outsert". An "outsert" as the term is used herein is a shaft connection mechanism that connects with the shaft on the outside of the shaft as is shown in the figures and more fully described hereafter.

With regard to arrow shafts, for example only, some arrow shafts with extremely small diameters require smaller thread/diameter than standard 8/32 threads found on majority of field points and broadheads. According to the prior art, such very small diameter shafts require a special tool to insert the "insert" to the proper depth which then requires adhesive of some sort to lock the receiver threads in place. Again, regardless of diameter of shaft or one piece exposed or hidden within the shaft, the failure mode and method of securing is identical regardless of configuration when any adhesive of any type is mandated so as to enable that system to work.

There is a need therefore for a mechanical insert/outsert system that eliminates entirely any need for adhesives regardless of the diameter of a shaft or tube, that is not limited to archery arrow shafts only but includes industrial applications as well that require removable, mechanical bonding either on the inside or on the outside of a shaft.

Thus, there is a need in the art for an insert and outsert for use with large and small interior and exterior diameter shafts, pipes, arrows and bolts, for example only, to aide in the manipulation and use of, and temporary attachment to, shafts that is easy to use and reuse and remove, that does not require adhesives or special tools to position and/or to secure it in place, that is inexpensive and reusable with multiple types of shafts, pipes, arrows and bolts, etc. even after damage to the pipe, arrow or bolt shaft.

It therefore is an object of this invention to provide an improved mechanical shaft insert/outsert apparatus and method that is easy to assemble and install and remove, requires no special tools or adhesives and that is long lasting, durable, reusable and economical to make and that is effective in connecting with both the inside and outside of a shaft, with all types of shafts, no matter the interior or exterior diameter, large or small.

SUMMARY

Accordingly, a mechanical shaft insert/outsert apparatus and method according to a preferred embodiment consists of a receiver and a wedge where the wedge has a first dimension and a second dimension where the second dimension is larger than the first dimension where the receiver and wedge are configured to connect with a shaft. An extension is configured to connect with the receiver and the wedge such that the connection draws the wedge and the receiver together causing the receiver to deform and apply pressure to the shaft.

In one aspect, the receiver and the wedge are configured to fit around the outside of the shaft such that the receiver and the wedge are removably attached to the shaft on the outside of the shaft upon deformation of the receiver causing it to contract and contact the outside of the shaft.

In one aspect, the receiver has an open first end and an open second end and where the wedge has an open second end and an interior configured to connect with the extension where the wedge has the second larger dimension at the open second end and where the wedge has the first dimension after the open second end such that insertion of the extension through the receiver and connection of the extension with the wedge interior draws the open second end of the wedge over the open second end of the receiver causing the open second end of the receiver to contract and contact the shaft.

In one aspect, the receiver and the wedge are configured to fit within a hollow portion of the shaft such that the receiver and the wedge are removably attached to the shaft within the hollow portion upon deformation of the receiver causing it to expand and contact the shaft within the hollow portion.

In another aspect, the receiver has an open first end and an open second end and where the wedge has an open first end and an interior configured to connect with the extension where the wedge has said first dimension at said open first end and wherein said wedge has said larger second dimension after said open first end such that insertion of said extension through said receiver and connection of said extension with said wedge interior draws the open first end of the wedge into the open second end of said receiver causing the open second end of the receiver to expand.

In another aspect, the receiver has an open first end configured to connect with the extension and where the wedge has an open first end and an interior and an open second end, where the wedge has the first dimension at the open first end and where the wedge has the larger second dimension after the open first end where the extension passes through the wedge such that connection of the extension with the receiver draws the open first end of the wedge into the open first end of the receiver causing the open first end of the receiver to expand.

In one aspect, the extension is connected to a base and the base includes a recessed lip configured to receive the open first end of the receiver such that the open first end of the receiver is prevented from passing the recessed lip.

In another aspect, the receiver includes an interior stop configured to receive the open first end of the wedge and prevent movement of the open first end of the wedge beyond the interior stop.

In one aspect, the invention further includes a torque resister configured to connect with the shaft within the hollow portion.

In another aspect, the torque resister includes a fin where the torque resister has a diameter larger than an inside diameter of the hollow portion of the shaft such that insertion of the torque resister into the shaft causes the fin to contact the inside of the shaft such that torque is resisted.

In another aspect, the invention further includes a weight bar configured to fit within the hollow portion of the shaft.

In one aspect, the invention further includes a washer at the base where the washer includes a guard connected to the washer where the guard covers a length of the shaft on the outside of the shaft.

According to another embodiment, a mechanical shaft insert/outsert apparatus includes a receiver and a wedge where the wedge has a first dimension and a second dimension where the second dimension is larger than the first dimension. A field point with a base, and a shaft with an open first end and a hollow portion and an outside where the receiver and the wedge are configured to connect with the shaft and a threaded extension with one end connected with the base of the field point and a free end, where the free end is configured to connect with the receiver and the wedge such that the connection draws the wedge and the receiver together causing the receiver to deform and contact the shaft.

In one aspect, the receiver and the wedge are configured to connect with the outside of the shaft such that the connection draws the wedge and the receiver together causing the receiver to deform and contact the outside of the shaft.

In another aspect, the receiver and the wedge are configured to fit within the open first end of the shaft in the hollow portion such that the connection draws the wedge and the receiver together causing the receiver to expand and contact the shaft within the hollow portion.

In another aspect, the invention further includes a torque resister configured to connect with the shaft within the hollow portion.

In one aspect, the invention further includes a weight bar configured to fit within the arrow shaft hollow portion.

According to another embodiment, a mechanical shaft insert/outsert method consists of a. providing a receiver and a wedge where the wedge has a first dimension and a second dimension where the second dimension is larger than the first dimension where the receiver and wedge are configured to connect with a shaft where the shaft has an open first end and a hollow portion and an outside; an extension configured to connect with the receiver and the wedge such that the connection draws the wedge and the receiver together causing the receiver to deform and contact the shaft; and b. connecting the extension with the receiver and with the wedge.

One aspect further includes steps for removing the mechanical shaft insert/outsert from connection with the shaft consisting of:

a. partially disconnecting the extension such that the receiver releases contact with the shaft; and b. removing the receiver and the wedge from the shaft while still connected with the extension.

Another aspect further includes a torque resister configured to connect with the shaft within the hollow portion and a weight bar configured to fit within the hollow portion.

In another aspect, the torque resister is rectangular in shape and has four fins.

In one aspect, the receiver includes an irregular, non-smooth, surface configured to grip the shaft.

DESCRIPTION OF THE DRAWINGS

Other objects, features and advantages of the present invention will become more fully apparent from the following detailed description of the preferred embodiment, the appended claims and the accompanying drawings in which:

FIG. 6 is a side sectional view of the invention in FIG. 4;

FIG. 7 is a side sectional view of the invention of FIG. 4 identifying an interior stop in the receiver;

FIG. 11 is a side partial cut away view of the invention of FIG. 8 with the wedge partially drawn into the open first end of the receiver;

FIG. 12 is a side partial cut away view of the invention of FIG. 11 inserted into an arrow shaft;

FIG. 13 is a side partial cut away view of the invention of FIG. 12 with the connection tightened such that the open first end of the receiver expands and contacts the arrow shaft on the hollow inside;

DETAILED DESCRIPTION OF EMBODIMENTS

Figure 1:
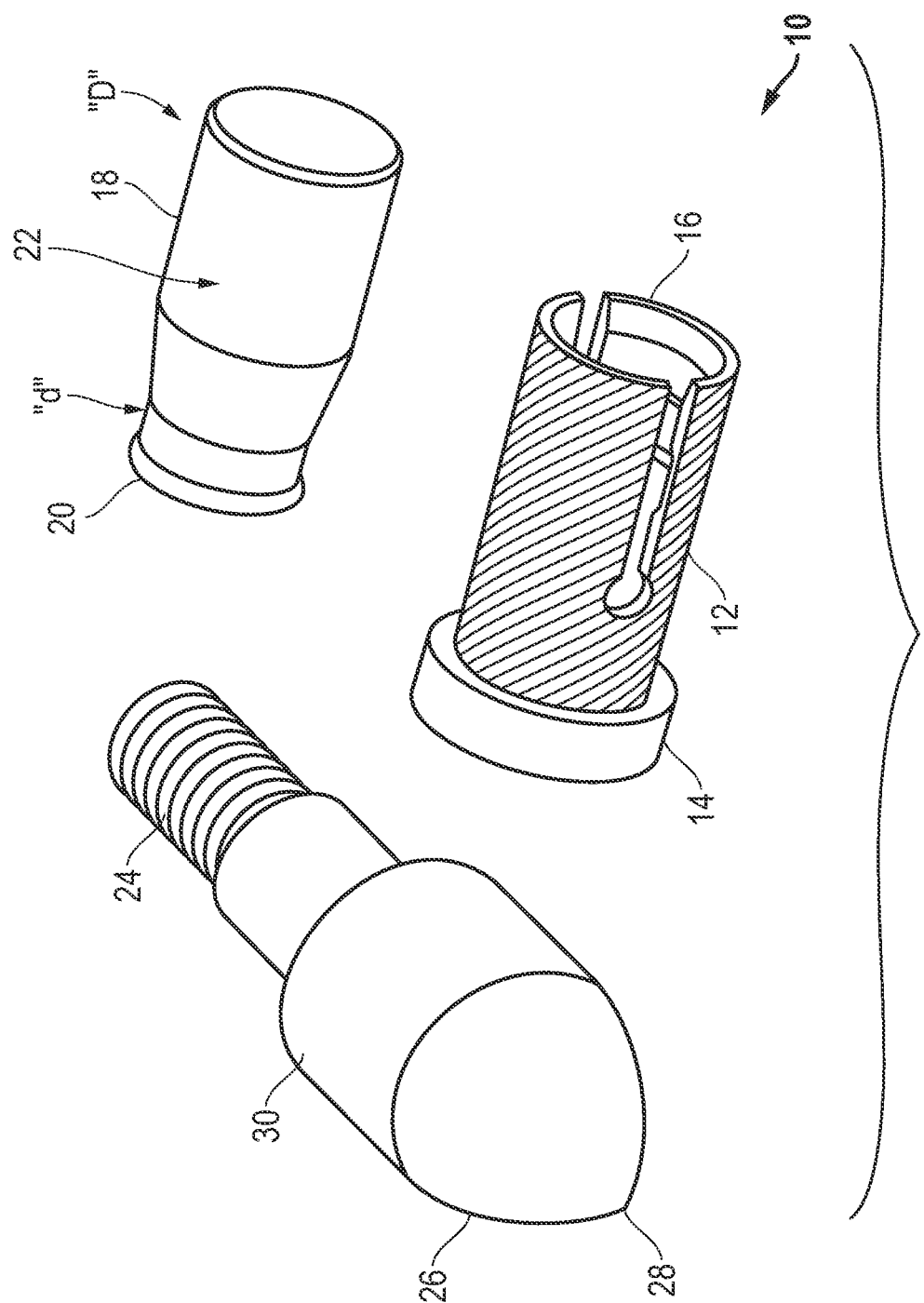
FIG. 1 is a perspective view of the mechanical shaft insert/outsert according to one embodiment and including an arrow field point.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention. The scope of the present invention covers both "Insert Systems" (one with an receiver with an open first and second end and one with an wedge with an open first and second end) which reside within the inner diameter of an arrow and/or bolt shaft to expand outward to lock in place as described in detail herein.

Additionally, as discussed above, the present invention is not limited to "insert" systems but also includes "Outsert" systems as follows. Many arrow shafts are of very small diameter and do not have a large enough inner diameter to accommodate an "Insert" system without damaging the small diameter shaft. Thus, the present invention, according to one embodiment, provides an "Outsert" using the same elements of the "Insert" system which is engineered to slide over the outside of shafts of arrows/bolts, pipe, tubes or the like, and compress upon the outer diameter of the shaft to reinforce it and to lock in place via deformation of the receiver and resulting compression on the outside of the shaft, all as described more fully hereafter.

It should also be noted that a plurality of hardware based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

One embodiment of the present invention is illustrated by way of example in FIGS. 1-16. Referring to FIG. 1, as shown, the present invention consists of mechanical shaft insert/outsert apparatus and method 10 consisting of a receiver 12, which in this embodiment, has an open first end 14 and an open second end 16. Receiver is "hollow' in this embodiment, such that objects can pass from the open first end 14 through the middle and out of the open second end 16 as shown in the FIGS. 1-4 and 6 and described more fully hereafter.

Figure 3:
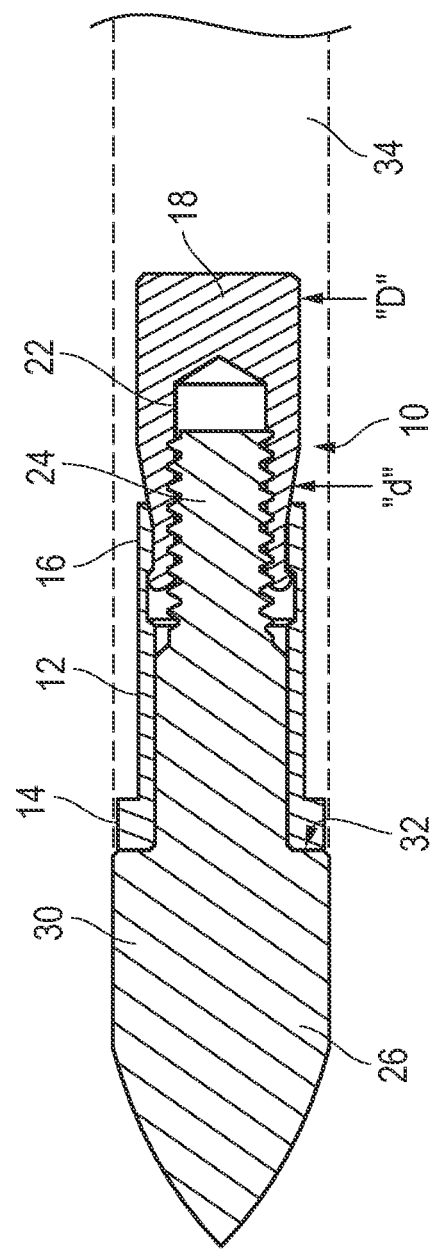
FIG. 3 is a side sectional view of the invention of FIG. 1 as shown in FIG. 2.

Wedge 18 has an open first end 20 and an interior 22 (shown more clearly in FIGS. 3, 6 and 7). That is, as shown, in this embodiment wedge 18 is not completely hollow and instead the interior 22 is configured to connect with an extension 24 as will be described more fully hereafter.

Wedge 18 has a first dimension "d" at the open first end 20 and has a larger second dimension "D" after the open first end 20.

FIG. 1 also shows a field point 26 with a tip 28 and a base 30 to which extension 24 is attached.

Figure 2:
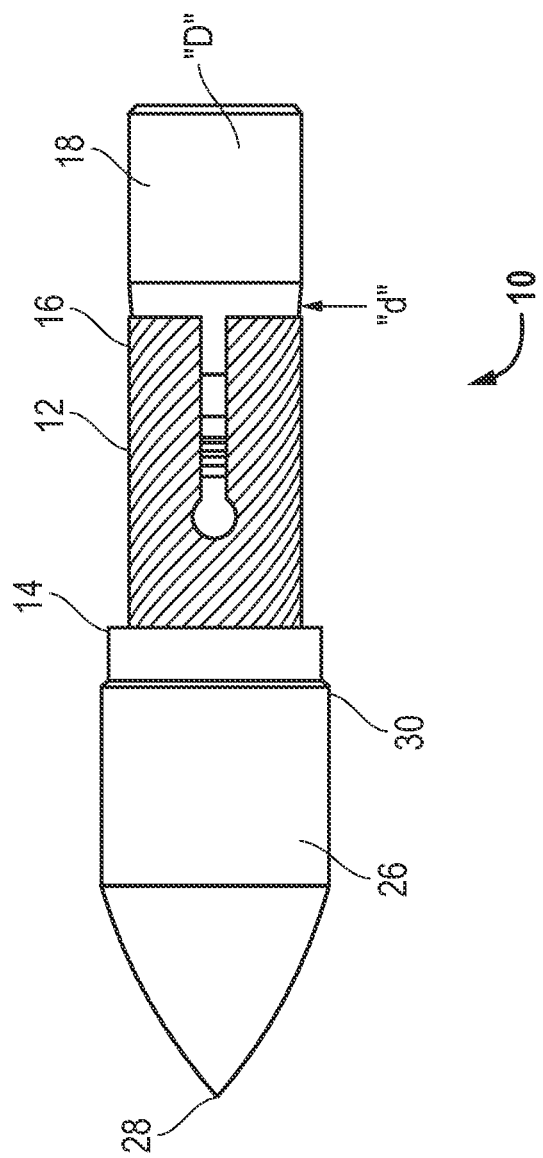
FIG. 2 is a side view of the invention of FIG. 1 with a receiver with an open first end and an open second end assembled prior to installation with a shaft.

Referring to FIGS. 2 and 3, the elements of the invention are shown ready for installation into a shaft hollow. The extension 24 has passed through the receiver 12 from open first end 14 past open second end 16 and has connected with interior 22 of wedge 18. Preferably, as shown by way of example only and not by limitation, the extension 24 connects with the interior 22 by means of screw threads as shown but any connection that serves the function of the present invention is acceptable. As the field point 26 is turned, the extension 24 connects with the threaded interior 22 and draws wedge 18 towards the base 30 of field point 26. As shown in FIGS. 2 and 3, initially the connection of the field point 26 and wedge 18 simply joins the two together, with the receiver 12 in between, since the open first end 20 of wedge 18 has a small dimension "d" that allows it to enter into open second end 16 of receiver 12.

FIG. 2 also shows a feature of this embodiment of the invention where base 30 of field point 26 includes a shoulder or lip 32. As shown, as extension 24 is screwed into interior 22 of wedge 18, the open first end 14 of receiver 12 is drawn up against lip 32 until it can move no further. At this stage, the assembled mechanical shaft insert is ready to be slipped into shaft 34 (shown in dashed lines) where shaft 34 has an open hollow end.

Figure 4:
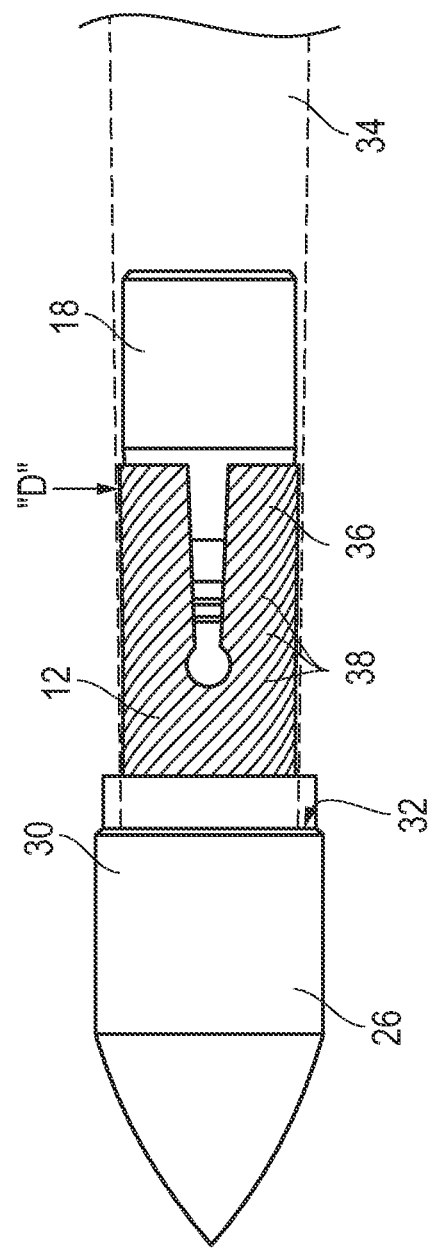
FIG. 4 is a side view of the invention of FIG. 1 as shown in FIG. 2 where the open second end of the receiver has expanded as the wedge is drawn into the open second end.

Referring now to FIGS. 4 and 6, insertion of the extension 24 through the receiver 12 connects the extension 24 with the wedge 18 interior 22 by screwing extension 24 into the threaded interior 22 and draws the open first end 20 of the wedge 18 into the open second end 16 of the receiver 12. This causes the open second end 16 of the receiver 12 to expand. That is, as the extension 24 and the threaded interior 22 are tightened together, the wedge 18 is drawn into the receiver 12 and the open second end 16 of the receiver 12 is forced to expand as wedge 18 moves from the small first dimension "d" to the larger second dimension "D".

This process fully and completely locks the mechanical shaft insert/outsert 10 in place within the shaft 34 without and glues or adhesives.

Figure 5:
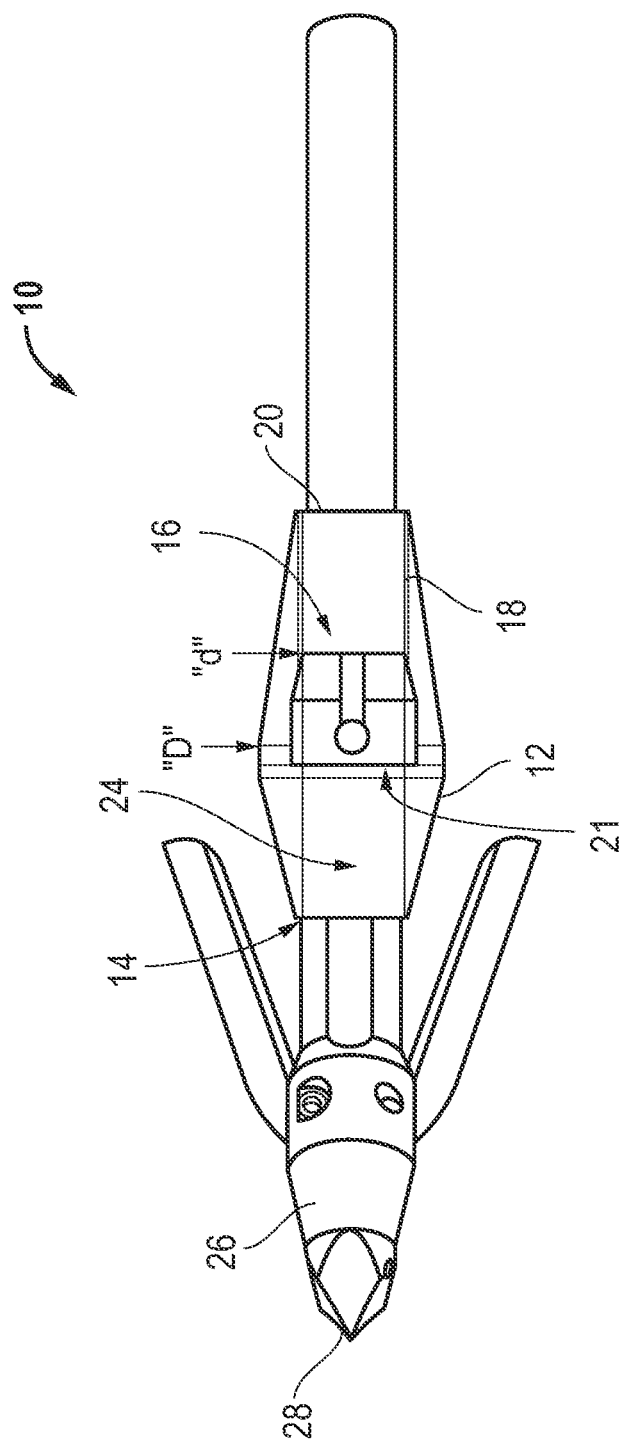
FIG. 5 is a side, partial sectional view of the invention of FIG. 1 as an "Outsert" attached to the outside of a shaft.

Referring now to FIG. 5, the embodiment of the "Outsert" structure of the present invention shows that the elements of the invention are the same yet reordered to accomplish a deformation of the receiver 12 that causes it to deform and compress around and securely contact the outside of shaft 34 rather than expand and contact the inside.

In this embodiment, receiver 12 has an open first end14 and an open second end 16 and wedge 18 has an open second end 21 and an interior 22 configured to connect with extension 24, all as previously described. In this embodiment, however, wedge 18 is configured to have the second larger dimension "D" at the open second end 21 first and the smaller first dimension "d" after said open second end 21 such that insertion of the extension 24 through the receiver 12 and connection of the extension 24 with the wedge 18 draws the larger dimension open second end 21 of the wedge 18 over the open second end 16 of the receiver 12 causing the open second end 16 of the receiver 12 to contract and contact the outside of the shaft 34.

Certainly, the order of the wedge 18 and receiver 12 may be reversed such that the receiver 12 is drawn into the wedge 18.

Importantly, in either configuration, insert or outsert, the present invention also enables users to quickly remove the mechanical shaft insert/outsert 10 of the present invention. In a further aspect, the method includes steps for removing the mechanical shaft insert/outsert 10 from the arrow shaft 34 simply by partially unscrewing extension 24, with the field point 26 when present, such that the connection of wedge 18 and receiver 12 is loosened such that the receiver 12 releases contact with the arrow shaft 34 either on the inside or the outside of the shaft 34.

FIG. 4 shows another element of the invention where the surface 36 of receiver 12 is an irregular non-smooth surface configured to grip the hollow shaft, or the outside of the shaft, when expanded or contracted, such as knurled or rough, gripping surface 38.

FIG. 7 highlights another embodiment of the invention where the receiver 12 includes an interior stop 39 configured to receive the open first end 20 of the wedge 18 and prevent movement of the open first end 20 of the wedge 18 beyond the interior stop 39. As shown interior stop 39 is formed by a recess in the receiver 12 that stops the user from over tightening the extension 24 and over expanding the open second end 16 of receiver 12 in this embodiment.

Referring now to FIGS. 8-11, one embodiment of the present invention consists of a mechanical shaft insert/outsert apparatus and method 10 consisting of a wedge 18 with an open first end 20 and, in this embodiment, an open second end 21. Wedge 18 is "hollow" such that objects can pass from the open second end 21 through the interior 18 and out of the open first end 20 as shown in the Figures and described more fully hereafter.

Receiver 12 has an open first end 14. That is, as shown, in this embodiment receiver 12 is not completely hollow and instead is configured to connect with an extension 24 as will be described more fully hereafter.

Wedge 18 has a first dimension "d" at the open first end 20 and has a larger dimension "D" after the open first end 20.

Figure 8:
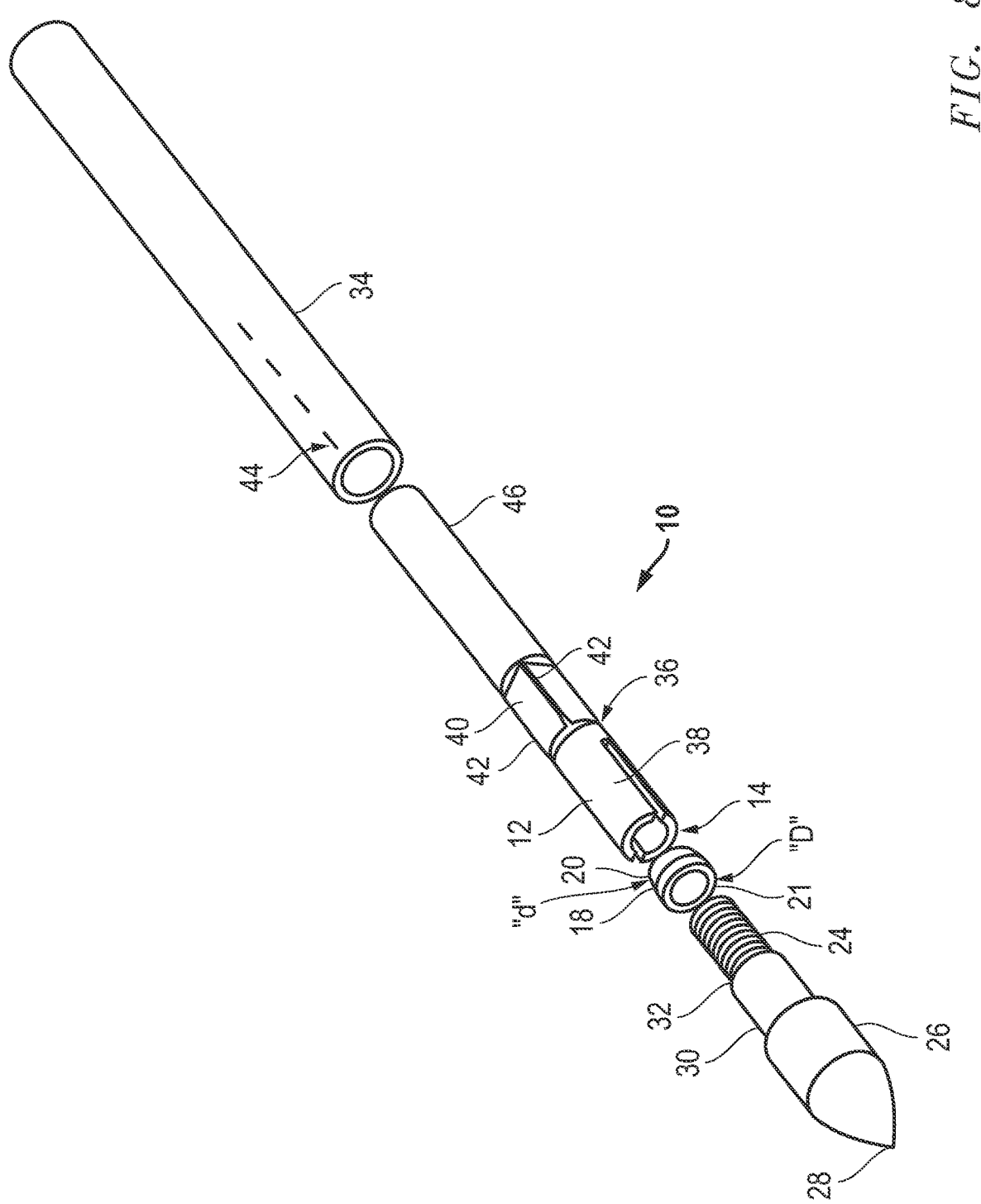
FIG. 8 is a perspective exploded view of the mechanical shaft insert/outsert according to one embodiment with a wedge with an open first end and an open second end and including an arrow field point.

FIG. 8 also shows a field point 26 with a tip 28 and a base 30, to which extension 24 is attached, and a lip 32. Further shaft 34 is shown as well as the exterior 36 of receiver 12 with a preferred rough, gripping surface 38.

Also shown is torque resister 40. Torque resister 40 has a slightly over diameter fin 42 as compared to the inside diameter of shaft 34. When inserted into shaft 34, fin 42 focuses pressure on the inside of the shaft 34 that provides resistance to movement. In one aspect, the fin 42 carves a channel 44 on the inside of the shaft 34. As a result, when torque is applied to the receiver 12, the fin 42 is held within channel 44 and resists rotational movement. Further, when removing receiver 12, the torque resister 40 slides easily out of the shaft 34 along the channel 44 when present. Preferably, torque resister 40 is rectangular in shape as shown and includes four fins 42. Certainly, any suitable form and fin number is included within the scope of the invention.

FIG. 8 also shows weight bar 46. Users of the present invention may add weight to the arrow shaft 34 by means of the weight bar 46 and adjust the weight by removing lengths of the weight bar 46 as deemed useful.

Figure 9:
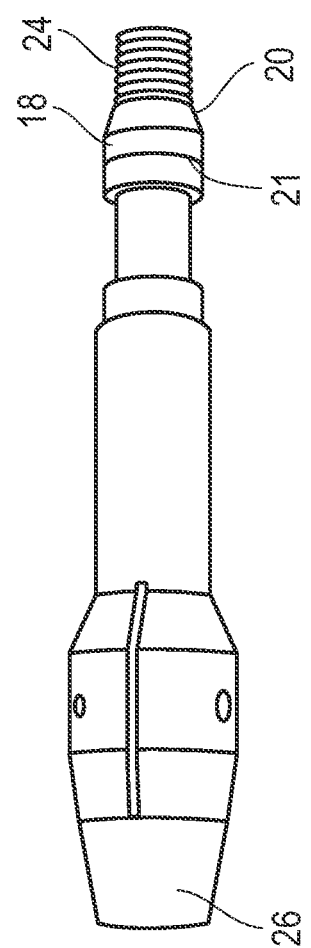
FIG. 9 is a side view of the invention of FIG. 8 with the wedge in place on the extension of an arrow field point.
Figure 10:
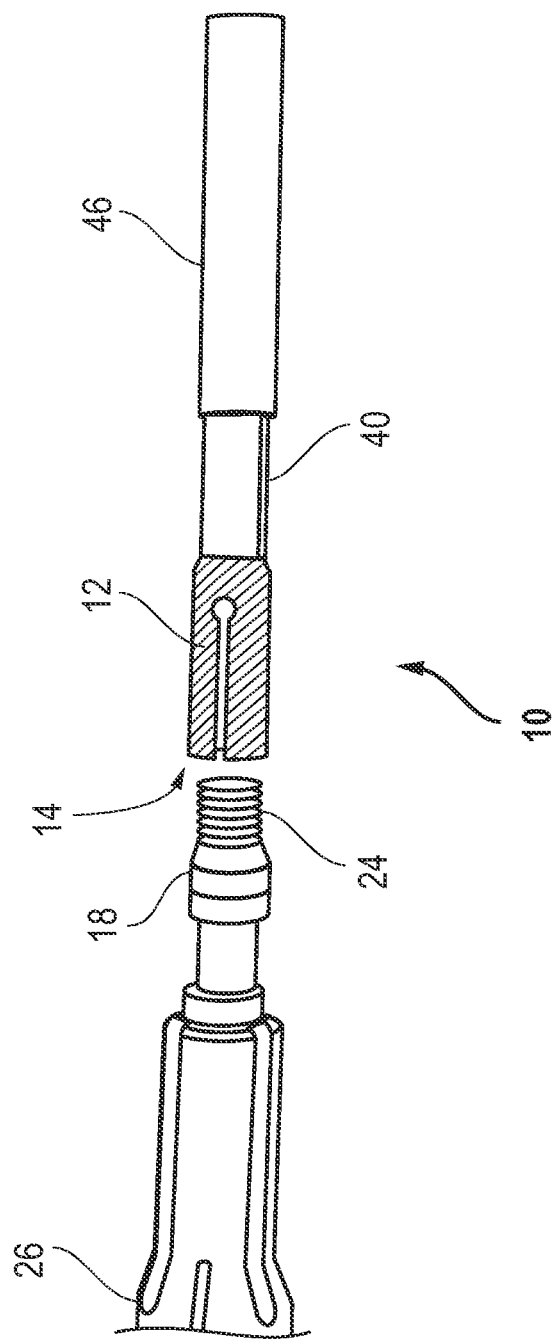
FIG. 10 is a side view of the invention of FIG. 8 as shown in FIG. 2 prior to connection of the extension with the receiver.

Referring to FIGS. 9, 10, and 11, the elements of the invention are shown ready for installation into a hollow shaft 34. FIG. 9 shows field point 26 with the extension 24 passed through the wedge 18 from open second end 21 past open first end 20 prior to connection with the receiver 12, torque resister 40, weight bar 46 assembly.

Preferably, as shown by way of example only and not by limitation, the extension 24 connects with the receiver 12 by means of screw threads as shown but any connection that serves the function of the present invention is acceptable. As the field point 26 is turned, the extension 24 connects, in this embodiment, with the threaded interior of the receiver 12 and draws wedge 18 towards the base 30 of field point 26. As shown in FIGS. 10 and 11, initially the connection of the field point 26 and receiver 12 simply joins the two together, with the wedge 18 in between, since the open first end 20 of wedge 18 has a small dimension "d" that allows it to enter into open first end 14 of receiver 12.

FIG. 11 also shows a feature of the invention where base 30 of field point 26 includes a shoulder or lip 32. As shown, as extension 24, in this embodiment, is screwed into receiver 12, the open second end 21 of wedge 18 is drawn up against lip 32 until it can move no further. At this stage, the assembled mechanical shaft insert/outsert 10 is ready to be slipped into a shaft 34 where shaft 34 has an open hollow end.

Referring to FIG. 12, insertion of the extension 24, in the embodiment shown, through the wedge 18 connects the extension 24 with the receiver 12 by screwing extension 24 into the threaded interior and draws the open first end 20 of the wedge 18 into the open first end 14 of the receiver 12. This causes the open first end 14 of the receiver 12 to expand. That is, as the extension 24 and the threaded interior are tightened together, the wedge 18 is drawn into the receiver 12 and the open first end 14 of the receiver 12 is forced to expand as it moves from the small dimension "d" to the larger dimension "D" of the wedge 18. This process fully and completely locks the mechanical shaft insert/outsert 10 in place within the shaft 34 without any glues or adhesives as shown in FIG. 13.

Importantly, the present invention also enables users to quickly remove the mechanical shaft insert/outsert 10 of the present invention. In a further aspect, the method includes steps for removing the mechanical shaft insert 10 from the arrow shaft 34 simply by partially unscrewing extension 24 with the field point 26, when present, such that the wedge 18 is allowed to withdraw from the receiver 12 such that the receiver 12 first end 14 contracts and releases contact with the arrow shaft 34.

Figure 14:
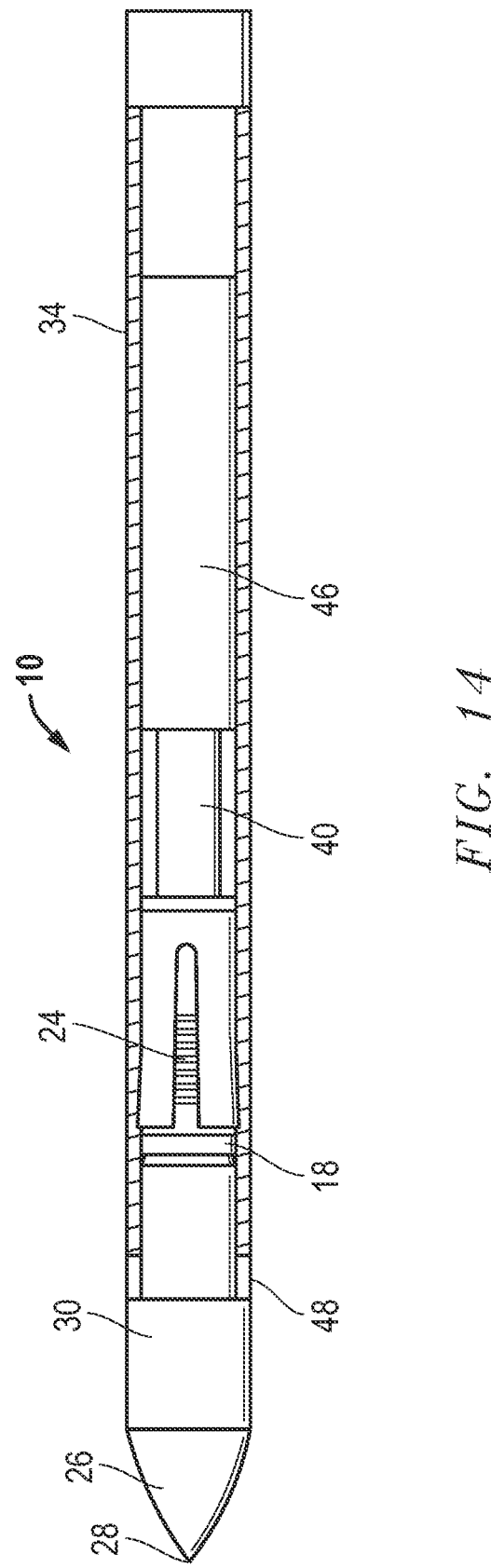
FIG. 14 is a side sectional view of the invention in FIG. 12 with a washer installed.
Figure 15:
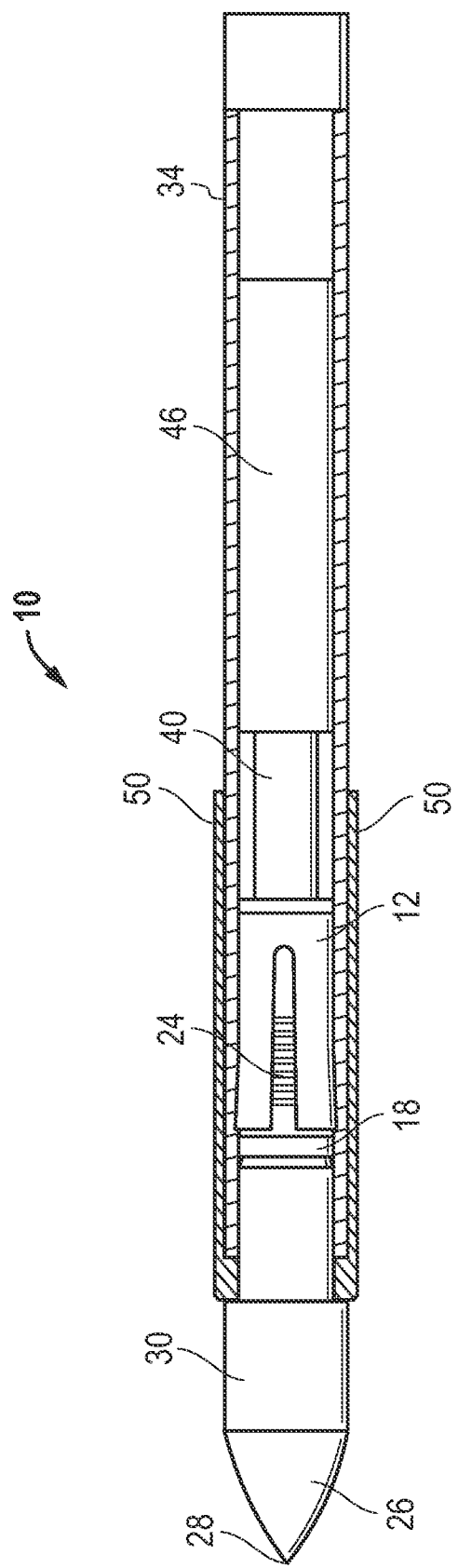
FIG. 15 is a side sectional view of the invention of FIG. 12 with a guard.
Figure 16:
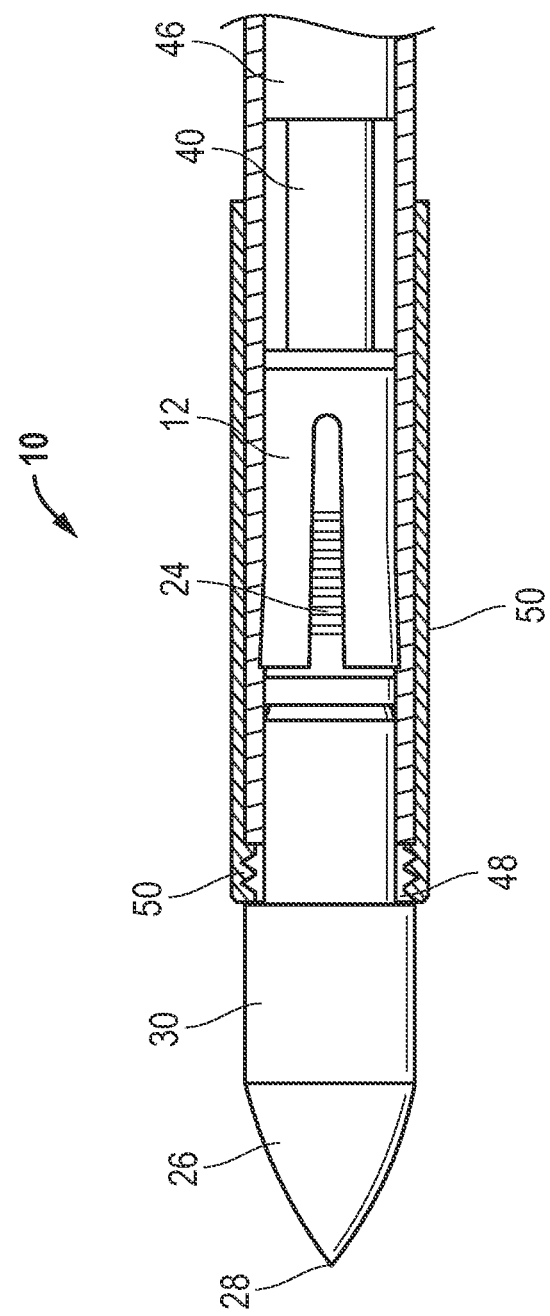
FIG. 16 is a side section view of the invention of FIG. 12 with a threaded guard connected with a threaded washer.

FIG. 14 shows the invention with a washer 48 installed as shown and FIG. 15 shows a guard 50. Washer 48 adds weight to the assembly and prevents damage to the open end of shaft 34 at the contact point with field point 26. Guard 50 spans a length of the shaft 34 and adds strength to the assembly and minimizes flexing of the shaft 34 thus preventing braking of the assembly. Further, guard 50 compresses shaft 34 and prevents shaft 34 from rupturing should the system be over tightened. FIG. 16 shows an embodiment with a threaded guard 50 connected with a threaded washer 48. Certainly, a threaded guard 50 may be connected with a threaded field point 26, not shown for clarity.

Referring again to FIG. 14, a washer 48 is shown between base 30 of field point/broadhead 26 and the end of arrow shaft 34. This provides added weight for "Front of Center" ("FOC") improvement and also adds a mechanical buffer to minimize frictional wear via rotation/twisting on cut/exposed fiber ends of the arrow shaft 34 during installation/removal. The washer 48 also aids in minimizing splitting of the arrow shaft 34 by varying geometry on the side making contact with end of arrow via entrapment and aiding compression of the end of the arrow cut end fibers. By varying the material of the washer 48 and not limited to brass, aluminum, stainless steel, etc. the present invention can achieve weights conducive to a consumer achieving his desired goal of FOC. Also, in the case of aluminum which can be anodized a variety of colors are made available. A customer/consumer can color match his/her preferred bow setup which adds a marketing value to the invention.

With regard to FIG. 15, this option or variation provides the same "Washer" effect but with the added material geometry that provides a guard 50 spanning a length covering the arrow shaft 34. Again, this provides added strength to the arrow by minimizing flex. The added weight also allows for improving FOC and if made of aluminum adds marketing value when anodized in various color options. Importantly, in view of the potential for the occasional snapping of the broadhead at that exact point of contact with the arrow, the guard 50 can be made to extend over the field point/broadhead. This additional extension variation adds strength at the point of base of broadhead to arrow seam junction. Thus eliminating the potential of the broadhead to break at that point.

With regard to FIG. 16, this option or variation provides the same "Washer" 48 effect as described but, in this case, with the washer 48 threaded, guard 50 can also be threaded on and mechanically locked in position. The added material geometry provides a guard 50 spanning a length covering the arrow shaft. This variation also provides added strength to the arrow by minimizing flex. The added weight also allows for improving FOC. And if made of aluminum adds the marketing value of being anodize in various color options.

By way of further description, as those skilled in the art are aware, essentially all broadheads and field points come standard with 8/32 UNC threads to screw into standard glue in inserts in the end of an arrow adapter. Applicant's invention is configured to match industry standard threads and utilize the threads, when a field point or a broadhead is screwed into the arrow shaft according to the present invention. As described herein, in one embodiment, this causes expansion of receiver 12 against inner diameter of arrow shaft 34 thus locking mechanically the novel insert system and field point/broadhead to the arrow shaft 34. In another embodiment, with the same elements of the invention, a secure connection is made with the outside of a shaft 34 as well.

As illustrated, preferably the receiver 12 is slit and may have a larger diameter open first end 14 at the start of the slit to allow both ease of expansion and prevent metal fatigue/failure. Knurling, rough gripping surface 38, of the contact area exterior surface 36 of receiver 12 is utilized to increase friction between the receiver 12 and the surfaces of the arrow shaft 34, whether on the inside or the outside of the shaft 34. The knurled area is preferably of a slightly smaller diameter than the interior diameter of the arrow shaft to prevent rasping/increasing inner diameter of the arrow shaft 34 during insertion and removal.

With regard to the torque resister 40, the preferred four fins 42 of the torque resistor 40 are preferably slightly oversize to the inner diameter of the arrow shaft 34 and inline with the direction of installation/removal. They can cause a small channel 44 to be made when being inserted. Applicant has determined that the fins 42 follow those same channels 44 when the present system 10 is being removed from an arrow shaft 34. The main functions of the torque resistor 40 is to prevent the receiver 12—torque resister 40—weight bar 46 (when present) assembly from spinning during install/removal. It also can create channels 44 that enable the assembly to move in a straight line. Applicant has determined that this enhances greatly the life of the arrow for those whom install/remove the system a great number of times. There is no appreciable degradation to either receiver assembly and/or inner diameter of arrow shaft.

Weight bar 46 allows a user to manage the material specific density to achieve a desired finished full assembly. For example, for aluminum, a typical target weight is 15 grains total weight, while those who prefer to improve Front Of Center may want 100 grains or more. Thus, brass and/or Steel allows achieving those desired weights by simply making the weight bar 46 longer or shorter to achieve that desired target weight. Preferably, the weight bar 46 also includes machined marks that define certain amounts where if cut off at that location removes twenty-five grains of weight, for example only. This allows a customer to fine tune the FOC of his/her arrows to achieve perfect arrow flight off of their uniquely setup bow/crossbow or any other means of arrow launching equipment.

The diameter of the weight bar 46 section is preferably slightly under that of the arrow/bolt ID. This allows for ease of installation/removal.

By way of continued description, the present invention provides a mechanism that utilizes the mechanical moving power capability of the threads, by way of example only and not by limitation, of the actual broadhead and/or field point 26 to facilitate drawing together a two part system (certainly it can be more than two parts) that pulls a wedge 18 and a receiver 12 together so as to cause the receiver 12 to deform and contact the arrow shaft 34. By operation of the present invention, tremendous holding power is created, either on the outside or the inside of a shaft 34, without risk of weakening and/or splitting and destroying the arrow shaft material. This mechanical expansion uses a wedge effect that forces a knurled or rough finished 38 surface of the receiver 12 to contact the arrow/bolt shaft 34. Applicant has determined by testing that this renders an adhesive force equal to or better than an adhesive bond agent.

That is with the roughened 38 surface 36 of the receiver 12 component in conjunction with the wedge 18, this system mechanically adheres with a tremendous holding power the mechanical shaft insert/outsert 10 to the arrow shaft 34. Receiver 12 has surface machining (mechanical blasting/tumbling, chemical application efforts and other alternative methods to achieve a rough textured surface 38 can be used as well) to enhance mechanical adhesion to the arrow/bolt shafts 34 in such a manner that a person cannot pull the mechanical shaft insert/outsert 10 out of contact with the shaft 34 even with intentional efforts to break the bond between this novel mechanical shaft insert/outsert system 10 and the arrow shaft 34 it is mounted to.

Also, testing shows that via normal wear/tear and use of the arrows/bolts, such repeated extreme and very harsh impacts, environmental influence, nothing during any extreme testing has loosened or compromised the integrity of the mechanical adhesion capacity of the present invention. Applicant believes this is due, in one embodiment of the invention, to all impact energy being transferred directly from the outer diameter surface mating of the novel mechanical shaft insert/outsert 10 invention with the wall thickness/diameter of the arrow shaft 34. As a result, there no unwanted direct and/or reflected impact energy is transferred to the holding mechanism. Thus, there is no difference in movement between the mechanical shaft insert/outsert 10 invention and arrow shaft 34. They act as one solid unit. In addition, thermal expansion of components via heat or cold has not revealed any negative results. Therefore, there is no weakening or damage to either the arrow shaft structure, the invention and/or the mechanical bond between the arrow shaft and invention. Further, this novel approach employs a mechanical insert/outsert connection without any adhesive, no special cleaning/curing, or tools. Only simple hand tightening is needed with no special tools required while enjoying a very structurally strong mechanical adherence to the arrow or bolt. And just as easily, via unscrewing the field point 26 and/or broadhead, the present invention can be easily removed.

To remove this mechanical shaft insert/outsert system 10 from the arrow shaft 34 without use of any tools, simply unscrew the broadhead slightly, utilize the threads to push the wedge 18 away from its tightened position with the receiver 12. Applicant has found that it is a very slight distance to move in order to unbind the mechanics from the shaft surfaces. Therefore, with use of a user's hands only, the entire mechanical shaft insert/outsert system 10 can easily be removed so as to be either easily re-installed with the same shaft and/or installed with a different arrow or bolt shaft and/or saved for use at a later date. No adhesives are required, no special cleaning or scarring of surface to enhance adhesion is needed. No waste to throw in the trash as the novel mechanical shaft insert/outsert 10 can be used over and over and over again.

In summary, the present mechanical shaft insert/outsert 10 provides the most cost effective and environmentally friendly insert and insert/outsert component system ever invented for arrow and bolt shafts as well as for pipes and tubes of all sorts. The present invention is especially critical on remote hunts or major competitions where no bench tools, adhesives or fixturing is available to swap out/install standard static prior art inserts. The archer/bow hunter can simply unscrew the broadhead/field point, tap the wedge loose and pull the entire system off while still attached to the broadhead or field point.

By way of continued description, the present invention provides a mechanism that utilizes the mechanical moving power capability of the threads of extension 24, by way of example only and not by limitation, of the actual broadhead and/or field point 26 to facilitate drawing together a two part system (certainly it can be more than two parts) that pulls a wedge 18 and receiver 12 together. This creates tremendous holding power without risk of weakening and/or splitting and destroying the arrow shaft material. This mechanical expansion or contraction forces a knurled or rough finished 38 surface 36 of the receiver 12 to deform and lodge itself against the arrow/bolt shaft 34. Applicant has determined by testing that this renders an adhesive force equal to or better than an adhesive bond agent. In one embodiment of design, a strategically positioned physical "Stop" 39 is machined into the receiver 12 so as to prevent over compression/over expansion and fracture of the arrow shaft material.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A mechanical shaft insert/outsert apparatus comprising:
    a. a receiver with an open first end;
    b. a wedge wherein said wedge has a first dimension and a second dimension wherein said second dimension is larger than said first dimension wherein the receiver and wedge are configured to connect with a shaft; and
    c. an extension configured to connect with said receiver and said wedge such that connection draws said wedge and said receiver together causing the receiver to deform and contact the shaft and wherein said receiver and said wedge are configured to fit within a hollow portion of said shaft such that said receiver and said wedge are removably attached to the shaft within said hollow portion upon deformation of said receiver causing it to expand and contact the shaft and wherein the extension is connected to a base and said base includes a recessed lip configured to receive the open first end of said receiver such that the open first end of the receiver is prevented from passing said recessed lip.

2. The apparatus of claim 1 wherein said receiver has an open first end and an open second end and wherein said wedge has an open first end and an interior configured to connect with said extension wherein said wedge has said first dimension at said open first end and wherein said wedge has said larger second dimension after said open first end such that insertion of said extension through said receiver and connection of said extension with said wedge interior draws the open first end of the wedge into the open second end of said receiver causing the open second end of the receiver to expand and contact the shaft.

3. The apparatus of claim 1 wherein said receiver has an open first end configured to connect with said extension and wherein said wedge has an open first end and an interior and an open second end, wherein said wedge has said first dimension at said open first end and wherein said wedge has said larger second dimension after said open first end wherein said extension passes through said wedge such that connection of said extension with said receiver draws the open first end of the wedge into the open first end of said receiver causing the open first end of the receiver to expand and contact the shaft.

4. The apparatus of claim 1 wherein said receiver includes an interior stop configured to receive the open first end of the wedge and prevent movement of said open first end of the wedge beyond said interior stop.

5. The apparatus of claim 1 further including a torque resister configured to connect with the shaft within the hollow portion.

6. The apparatus of claim 5 wherein the torque resister includes a fin wherein said torque resister has a diameter larger than an inside diameter of the hollow portion of said shaft such that insertion of said torque resister into said shaft causes said fin to contact the inside of the shaft such that torque is resisted.

7. The apparatus of claim 1 further including a weight bar configured to fit within the hollow portion of said shaft.

8. The apparatus of claim 1 further including a washer at said base wherein said washer includes a guard connected to said washer wherein said guard covers a length of said shaft on the outside of said shaft.

9. A mechanical shaft insert/outsert apparatus comprising:
a. a receiver;
b. a wedge wherein said wedge has a first dimension and a second dimension wherein said second dimension is larger than said first dimension;
c. a field point with a base;
d. a shaft with an open first end and a hollow portion and an outside wherein said receiver and said wedge are configured to connect with said shaft; and
e. a threaded extension with one end connected with said base of said field point and a free end, wherein said free end is configured to connect with said receiver and said wedge such that connection draws said wedge and said receiver together causing the receiver to deform and contact the shaft.

10. The apparatus of claim 9 wherein said receiver and said wedge are configured to connect with said outside of said shaft such that said connection draws said wedge and said receiver together causing the receiver to deform and contact the outside of said shaft.

11. The apparatus of claim 9 wherein said receiver and said wedge are configured to fit within the open first end of said shat in said hollow portion such that said connection draws said wedge and said receiver together causing the receiver to expand and contact the shaft within the hollow portion.

12. The apparatus of claim 9 further including a torque resister configured to connect with the shaft within the hollow portion.

13. The apparatus of claim 9 further including a weight bar configured to fit within the arrow shaft hollow portion.

14. A mechanical shaft insert/outsert method comprising:
a. providing a receiver and a wedge wherein said wedge has a first dimension and a second dimension wherein said second dimension is larger than said first dimension; a field point with a base; a shaft with an open first end and a hollow portion and an outside wherein said receiver and said wedge are configured to connect with said shaft and a threaded extension with one end connected with said base of said field point and a free end, wherein said free end is configured to connect with said receiver and said wedge such that connection draws said wedge and said receiver together causing the receiver to deform and contact the shaft; and
b. connecting said extension with said receiver and with said wedge.

15. The method of claim 14 further including steps for removing said mechanical shaft insert/outsert from connection with said shaft consisting of:
a. partially disconnecting said extension such that said receiver releases contact with the shaft; and
b. removing said receiver and said wedge from said shaft while still connected with said extension.

16. The method of claim 14 further including a torque resister configured to connect with the shaft within the hollow portion and a weight bar configured to fit within the hollow portion.

* * * * *